United States Patent
Scott

(10) Patent No.: US 9,505,492 B2
(45) Date of Patent: Nov. 29, 2016

(54) MISSION ADAPTIVE ROTOR BLADE

(75) Inventor: Mark W. Scott, Bethany, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 779 days.

(21) Appl. No.: 13/403,364

(22) Filed: Feb. 23, 2012

(65) Prior Publication Data

US 2013/0224017 A1    Aug. 29, 2013

(51) Int. Cl.
*B64C 27/46* (2006.01)
*B64C 27/615* (2006.01)
*B64C 27/32* (2006.01)

(52) U.S. Cl.
CPC ........... *B64C 27/615* (2013.01); *B64C 27/325* (2013.01); *B64C 27/463* (2013.01); *Y02T 50/34* (2013.01)

(58) Field of Classification Search
USPC ........ 416/23, 24, 90 R, 91, 92, 90 A, 231 R, 416/231 B; 244/206
See application file for complete search history.

(56) References Cited

U.S. PATENT DOCUMENTS

| | | | |
|---|---|---|---|
| 2,638,990 A | 5/1953 | Pitcairn | |
| 2,759,548 A * | 8/1956 | Yuan et al. | 416/24 |
| 2,959,373 A | 11/1960 | Zuck | |
| 3,100,539 A * | 8/1963 | Hulbert | 416/91 |
| 3,155,341 A | 11/1964 | Girard | |
| 3,713,750 A | 1/1973 | Williams | |
| 4,045,146 A * | 8/1977 | Crimi | B64C 27/325 416/1 |
| 4,507,050 A | 3/1985 | Jeffery et al. | |
| 4,534,702 A | 8/1985 | Johnson, Jr. | |
| 5,562,414 A * | 10/1996 | Azuma | B64C 23/06 244/1 N |
| 5,588,800 A | 12/1996 | Charles | |
| 5,711,651 A * | 1/1998 | Charles | B64C 27/001 244/17.13 |
| 5,813,625 A | 9/1998 | Hassan | |
| 6,131,849 A | 10/2000 | Nyhus | |
| 6,200,096 B1 | 3/2001 | Kohlhepp | |
| 6,203,269 B1 * | 3/2001 | Lorber | B64C 11/18 244/207 |
| 6,283,406 B1 * | 9/2001 | Remington | B64C 23/06 244/1 N |
| 6,295,006 B1 | 9/2001 | Kohlhepp | |
| 6,425,553 B1 | 7/2002 | Smith et al. | |
| 6,863,239 B2 | 3/2005 | Terpay | |
| 6,932,569 B2 | 8/2005 | Torok et al. | |
| 6,948,906 B2 | 9/2005 | Leishman | |
| D524,227 S | 7/2006 | Stille et al. | |
| D524,229 S | 7/2006 | Stille et al. | |
| D524,230 S | 7/2006 | Stille et al. | |

(Continued)

FOREIGN PATENT DOCUMENTS

| | | | |
|---|---|---|---|
| JP | 06199295 A * | 7/1994 | |
| JP | 5319395 A | 10/2013 | |
| JP | 5345596 A | 11/2013 | |

*Primary Examiner* — Richard Edgar
(74) *Attorney, Agent, or Firm* — Cantor Colburn LLP

(57) ABSTRACT

A rotor assembly for a rotary wing aircraft includes a plurality of rotor blades operably connected to a rotor shaft. Two or more active adaptive devices are located at one or more rotor blades of the plurality of rotor blades. The one or more active adaptive devices are operably connected to an aircraft flight control system such that, when activated, the one or more active adaptive devices change one or more operational characteristics of the rotor assembly. A method of operating a rotor assembly of a rotary wing aircraft includes rotating a plurality of rotor blades about a rotor shaft. Two or more active adaptive devices located at one or more rotor blades of the plurality of rotor blades are activated and change one or more operational characteristics of the rotor assembly.

16 Claims, 4 Drawing Sheets

(56) References Cited

U.S. PATENT DOCUMENTS

| | | |
|---|---|---|
| 7,275,711 B1 | 10/2007 | Flanigan |
| 7,611,090 B2 | 11/2009 | Oleshchuk |
| D614,559 S | 4/2010 | Alber et al. |
| 7,708,229 B1 | 5/2010 | Angle, II et al. |
| 7,758,310 B2 | 7/2010 | Cotton et al. |
| 7,967,239 B2 | 6/2011 | Cotton et al. |
| 8,267,653 B2 | 9/2012 | Nies |
| 9,120,567 B2 * | 9/2015 | Scott ................ B64C 27/72 |
| 2004/0169108 A1 | 9/2004 | Terpay |
| 2008/0135677 A1 | 6/2008 | Oleshchuk et al. |
| 2010/0259046 A1 | 10/2010 | Kota et al. |
| 2012/0160954 A1 | 6/2012 | Thomassey |

* cited by examiner

MISSION ADAPTIVE ROTOR BLADE

STATEMENT REGARDING FEDERALLY SPONSORED RESEARCH OR DEVELOPMENT

This invention was made with Government support under Other Transaction No. HR0011-10-9-0002 awarded by DARPA. The Government has certain rights in this invention.

BACKGROUND OF THE INVENTION

Helicopter designs are typically the result of significant compromises to achieve both horizontal and vertical flight. This is particularly true of the helicopter rotor system. Depending on the helicopter, rotors may be optimized for, for example, high speed flight, low noise operation, high "g" maneuverability, or heavy lifting capability. Rotor design features enhancing vertical performance attributes, such as heavy lift capability, often directly conflict with features enhancing forward flight, especially high speed flight. The art would well receive a rotor system which can adapt to more than one of the above performance attributes.

BRIEF DESCRIPTION OF THE INVENTION

A rotor assembly for a rotary wing aircraft includes a plurality of rotor blades operably connected to a rotor shaft. Two or more active adaptive devices are located on one or more rotor blades of the plurality of rotor blades. The one or more active adaptive devices are operably connected to an aircraft flight control system such that, when activated, the one or more active adaptive devices change one or more operational characteristics of the rotor assembly.

A method of operating a rotor assembly of a rotary wing aircraft includes rotating a plurality of rotor blades about a rotor shaft. Two or more active adaptive devices located at one or more rotor blades of the plurality of rotor blades are activated and change one or more operational characteristics of the rotor assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
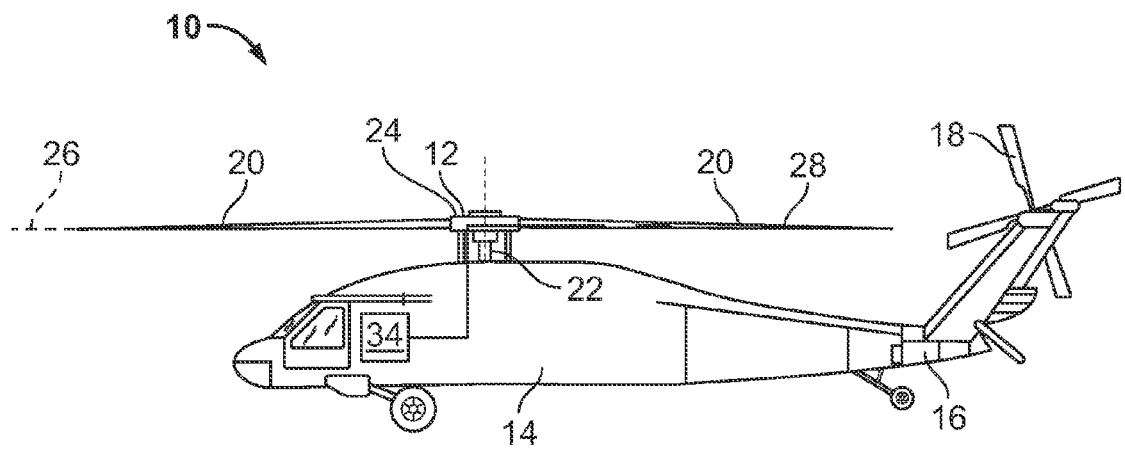
FIG. 1 is a schematic view of an embodiment of a rotary wing aircraft.

FIG. 1 is a schematic illustration of a rotary wing aircraft 10 having a main rotor assembly 12. The aircraft 10 includes an airframe 14 having an extending tail 16 at which is mounted an anti-torque rotor 18. Although the configuration illustrated is a single main rotor helicopter, it is to be appreciated that other machines such as tandem rotor helicopters, turbo-props, tilt-rotor aircraft, and co-axial rotorcraft will also benefit from the system of the present disclosure. The main rotor assembly 12 includes a plurality of rotor blades 20 located about a rotor shaft 22. The rotor blades 20 are operably connected to the rotor shaft 22 via a swashplate 24, which allows for a change in pitch of the rotor blades 20 about a blade axis 26.

The rotor blades 20 include one or more active adaptive devices which allow the rotor blades 20 and main rotor assembly 12 to adapt to different flight missions and the unique requirements of each flight mission. The adaptive devices, when selectively activated based on mission requirements, may, for example, increase maximum rotor blade 20 lift, suppress characteristics such as vibration and/or noise, increase flight speed, improve hover performance at high gross weights, increase maneuverability, or the like. A primary goal is to use the combination of multiple devices to enhance overall rotor attributes and performance. An on blade device typically enhances one or two rotor attributes such as low noise, low vibration, efficiency, maneuverability, payload, or speed. The purpose is to use multiple devices to provide a rotor increased capabilities among all these attributes. The devices can be turned on or off as the mission segment requires. The devices are also designed to work synergistically to maximize rotor capabilities.

Figure 2:
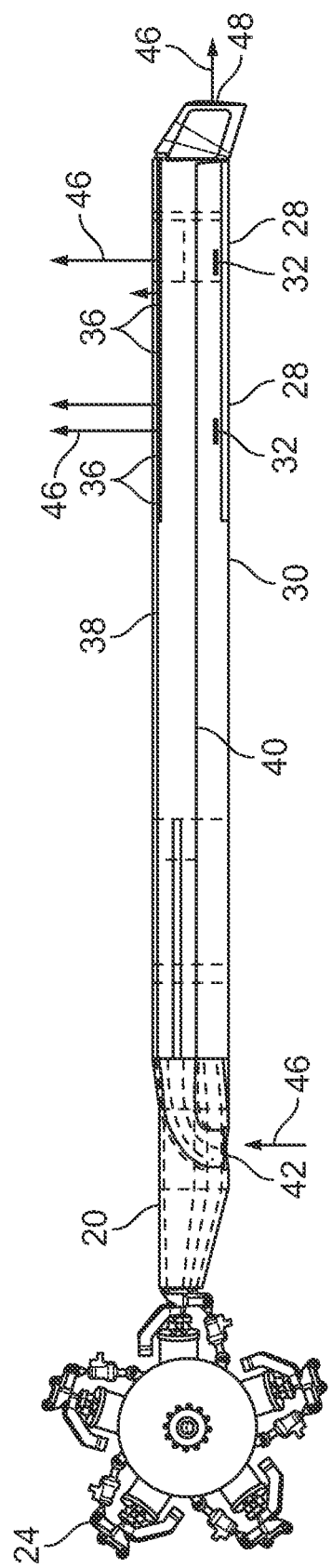
FIG. 2 is a plan view of an embodiment of a rotor blade.

Referring to FIG. 2, one example of adaptive device is one or more flaps 28 located, in some embodiments, at a trailing edge 30 of the rotor blade 20. Flaps 28 may be in the form of conventional plain flaps, movable Gurney flaps, or other trailing edge devices used to change airfoil lift, drag, and moment. The flaps 28 are driven by one or more actuators, for example, one or more electromechanical actuators 32 or pneumatic actuators or the like located at the rotor blade 20. The electromechanical actuators 32 are operably connected to the flaps 28 and to a flight control system of the aircraft 10, for example, a flight control computer 34 (shown in FIG. 1). When the one or more flaps 28 are activated at the same or higher harmonic frequencies of rotational speed of the rotor assembly 12, for example, the flaps 28 are activated and deactivated at a rate at or greater than once per revolution of the rotor assembly 12, vibration and noise of the rotor assembly 12 can be suppressed, and efficiency can be increased. Further, by activating the one or more flaps 28 discretely at a retreating side of the rotor assembly 12, at each rotor blade 20 when it is retreating, the flap 28 creates a higher lift coefficient, thus creating more blade lift for the same retreating side airflow. This advantageously postpones retreating blade stall to higher flight airspeeds. Also, activating flaps 28 collectively downwardly when the aircraft 10 is in hover effectively twists the rotor blade 20. The increased twist is beneficial at higher gross weights because the airflow through the rotor 12 increases, and increasing the twist better aligns the rotor blades 20 with the higher airflow. The net result is higher rotor efficiency at high gross aircraft 10 weights.

Figure 3:
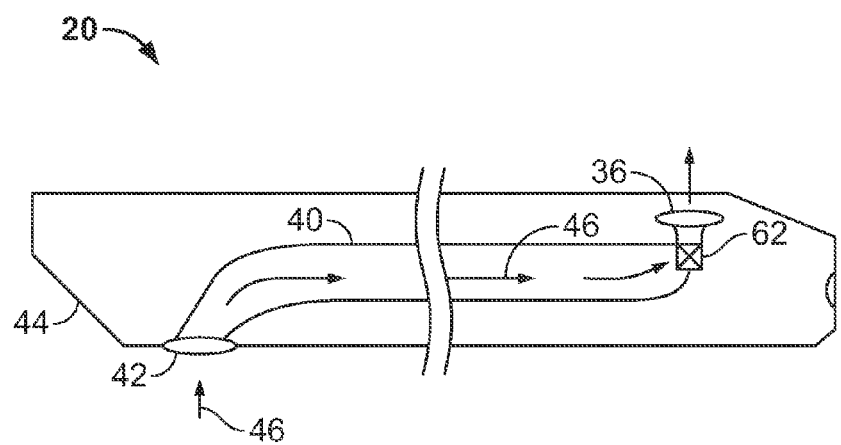
FIG. 3 is a plan view of an embodiment of a rotor blade including an internal duct.
Figure 4:
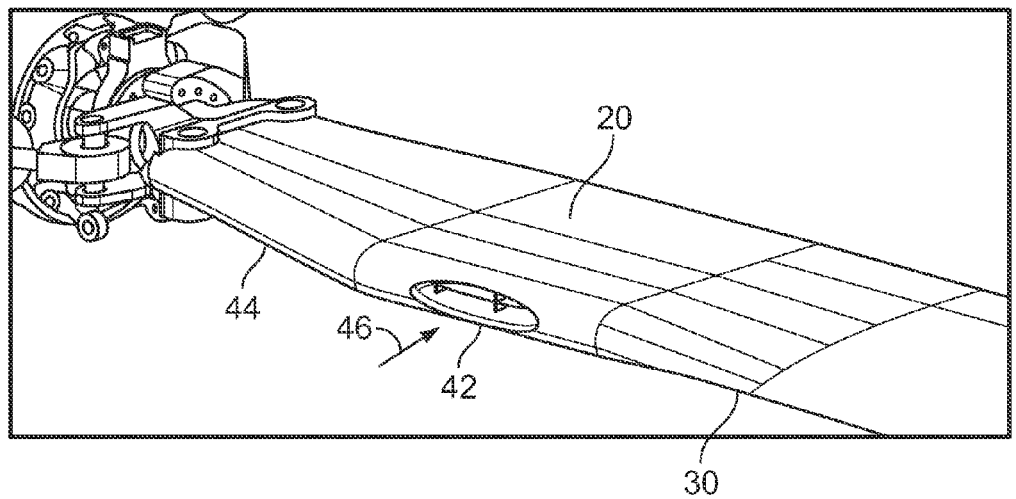
FIG. 4 is a perspective view of an embodiment of a rotor blade having an air inlet.
Figure 5:
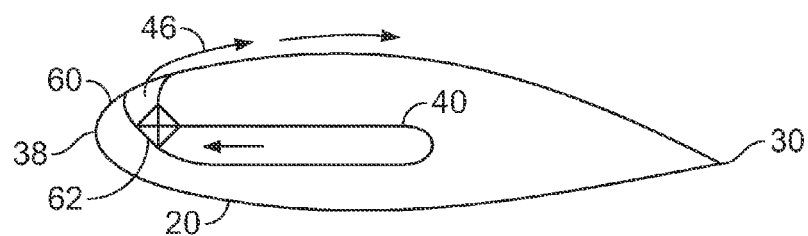
FIG. 5 is a cross-sectional view of an embodiment of a rotor blade having an internal duct.

Referring to FIG. 3, in some embodiments, the rotor blade 20 includes one or more air outlets 36 at or near a leading edge 38 of the rotor blade 20. In some embodiments, the air outlets 36 are located at a leading edge upper surface 60 of the rotor blade 20. The air outlets 36 may be slot shaped and are connected to an internal spar air duct 40 extending along a span of the rotor blade 20 from a duct inlet 42 to the air outlets 36. The duct 40 is fed by the duct inlet 42 (best shown in FIG. 4), which in some embodiments is located at or near a root 44 of the trailing edge 30. Referring again to FIG. 3, as the rotor blade 20 rotates, an airflow 46 is centrifugally pumped into the duct 40 through the duct inlet 42 and is urged toward the air outlets 36. The airflow 46 exits the air outlets 36 to increase maximum blade lift. Referring to FIG. 5, maximum blade lift is increased by blowing the air through the air outlets 36 substantially tangentially to the upper surface in a rearward direction, toward the trailing edge 30 of the rotor blade 20. The airflow 46 energizes the boundary layer and delays separation as angle of attack is increased thus increasing maximum blade lift. Referring again to FIG. 3, flow through the air outlets 36 may be controlled (turned on/off or metered) by one or more valves 62 located between the duct 40 and the air outlets 36. Operation of the one or more valves 60 may be controlled by the flight control computer 34.

Figure 6:
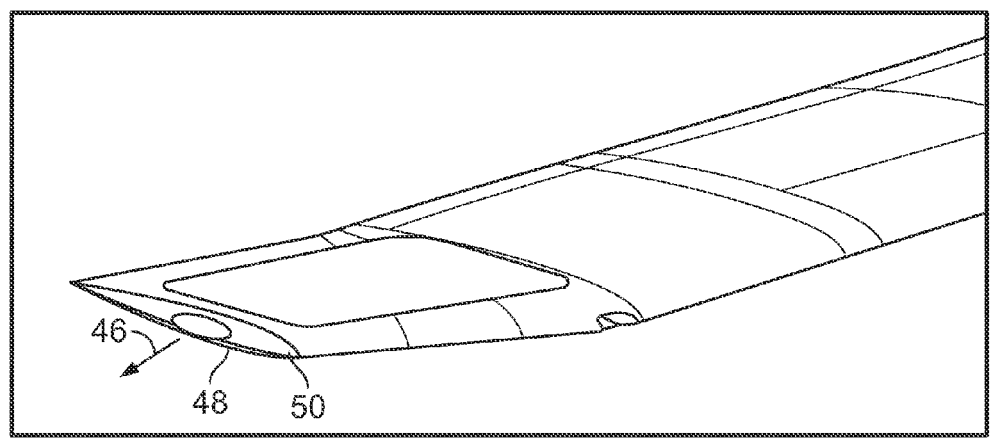
FIG. 6 is a perspective view of an embodiment of a rotor blade having an air outlet.

It is highly desirable to reduce the noise of rotor assembly 12 in flight. A powerful means to reduce noise is to reduce rotational speed of rotor assembly 12. However, rotational speed reductions come at the expense of rotor assembly lift and aircraft speed and maneuverability. The reductions are due to rotor assembly stall occurring at reduced flight speeds and/or reduced gross weights. In order to maintain aircraft speed and maneuverability and not sacrifice aircraft gross weight, the flaps 28 and air outlets 34 are utilized at lower rotor assembly rotational speeds. Thus rotor assembly lift, and aircraft speed and maneuverability can be maintained at adequate levels. As such, synergy between flaps 28, outlets 34, and the rotational speed of the rotor assembly 12 reduces rotor assembly noise levels. In some embodiments rotational speed reductions between about 10% and 15% can be attained. In situations where an increased rotor assembly rotational speed is required or desired, such as when increased gross weight capability is desired, another active measure may be utilized to reduce rotor assembly 12 noise. For example, the rotor blade 20 may include a tip jet outlet 48 (shown in FIG. 6) located at a rotor blade tip 50 and connected to the duct 40. At increased rotor assembly speeds, airflow 46 through the duct 40 is directed through the tip jet outlet 48 instead of, or in addition to, through the air outlets 36.

Airflow 46 pumped through the duct 40 creates a high pressure mass source at the blade tip 50. The mass source, when modulated by releasing airflow 46 through the tip jet valve and outlet 48, at a once per rotor 12 revolution frequency cancels rotor blade 20 thickness noise. The airflow 46 released through the tip jet outlet 48 creates a positive pressure pulse shape which counteracts a negative pressure pulse shape of the rotor blade 20. Rotor blade 20 noise is a result of this negative pressure pulse and by counteracting it with the positive pressure pulse the rotor blade 20 noise is reduced. In some embodiments, the airflow 46 through the tip jet outlet 48 is activated when the rotor blade 20 is advancing. Further, the airflow 46 through the tip jet outlet 48 may be modulated as a substantially constant flow to diffuse a vortex at the blade tip 50, thereby reducing blade vortex interaction noise.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor assembly for a rotary wing aircraft comprising:
a plurality of rotor blades operably connected to a rotor shaft; and
active adaptive devices disposed at one or more rotor blades of the plurality of rotor blades, the active adaptive devices operably connected to an aircraft flight control system such that, when activated, the active adaptive devices change one or more operational characteristics of the rotor assembly, the active adaptive devices including:
a spar air duct extending along one or more rotor blades of the plurality of rotor blades, the spar air duct having at least one inlet disposed at a first edge of the rotor blade and at least one outlet disposed at a second opposing edge of the rotor blade;
one or more valves to selectively turn on an airflow through the at least one outlet for a first mission and turn off an airflow through the at least one outlet for a second mission; and,
a blade tip outlet disposed at a blade tip of the one or more rotor blades, the blade tip outlet in fluid communication with the spar air duct;
wherein an airflow through the spar air duct is selectably urgable through the at least one outlet to increase lift of the one or more rotor blades in the first mission, and selectably urgable through the blade tip outlet to reduce noise of the rotor assembly in the second mission.

2. The rotor assembly of claim 1, wherein the active adaptive devices further include at least one flap disposed at a trailing edge of at least one rotor blade of the plurality of rotor blades.

3. The rotor assembly of claim 2, wherein a position of the at least one flap is controlled by one or more electromechanical actuators disposed at the at least one rotor blade.

4. The rotor assembly of claim 2, wherein activation of the at least one flap at a selected rotational speed of the rotor assembly results in suppression of at least one of vibration or noise of the rotor assembly.

5. The rotor assembly of claim 2, wherein activation of the at least one flap in a retreating portion of rotation of the rotor blade results in an increase in at least one of lift of the rotor assembly or flight speed of the aircraft.

6. The rotor assembly of claim 1, wherein the at least one outlet is disposed in proximity to a leading edge of the one or more rotor blades.

7. The rotor assembly of claim 6, wherein the active adaptive devices further include at least one flap disposed at a trailing edge of the one or more rotor blades.

8. The rotor assembly of claim 1, wherein an airflow through the spar air duct is selectably urgable in a third mission through the at least one outlet to increase lift of the one or more rotor blades and additionally through the blade tip outlet to reduce noise of the rotor assembly.

9. A method of operating a rotor assembly of a rotary wing aircraft comprising:

rotating a plurality of rotor blades about a rotor shaft, one or more rotor blades of the plurality of rotor blades including active adaptive devices including a spar air duct extending along the one or more rotor blades, a spar duct inlet located at a first edge of the one or more rotor blades, at least one outlet located at a second edge of the one or more rotor blades, opposite the first edge, one or more valves controllable between an on condition and an off condition to selectively turn on an airflow through the at least one outlet for a first mission and selectively turn off an airflow through the at least one outlet for a second mission, and a blade tip outlet disposed at a blade tip of the one or more rotor blades, the blade tip outlet in fluid communication with the spar air duct;

selectively activating the active adaptive devices; and changing one or more operational characteristics of the rotor assembly via the activation of the one or more active adaptive devices;

wherein selectively activating the active adaptive devices includes:

urging an airflow into the spar duct inlet and through the spar air duct;

controlling the one or more valves from the off condition to the on condition to selectably urge the airflow from the spar air duct through the at least one outlet to increase lift of the one or more rotor blades in the first mission; and, selectably urging the airflow from the spar air duct through the blade tip outlet to reduce noise in the second mission.

10. The method of claim 9, wherein activating the active adaptive devices further comprises activating at least one flap disposed at a trailing edge of at least one rotor blade of the plurality of rotor blades.

11. The method of claim 10, wherein the at least one flap is activated at a selected rotational speed of the rotor assembly.

12. The method of claim 11, wherein changing one or more operational characteristics of the rotor assembly comprises suppressing at least one of vibration or noise of the rotor assembly.

13. The method of claim 10, wherein the at least one flap is activated in a retreating portion of rotation of the rotor blade.

14. The method of claim 13, wherein changing one or more operational characteristics of the rotor assembly comprises increasing at least one of lift of the rotor assembly or flight speed of the aircraft.

15. The method of claim 9, wherein the at least one outlet is disposed in proximity to a leading edge of the one or more rotor blades.

16. A rotor assembly for a rotary wing aircraft comprising:

a plurality of rotor blades operably connected to a rotor shaft; and active adaptive devices disposed at one or more rotor blades of the plurality of rotor blades, the active adaptive devices operably connected to an aircraft flight control system such that, when activated, the active adaptive devices change one or more operational characteristics of the rotor assembly, the active adaptive devices including:

a spar air duct extending along the one or more rotor blades of the plurality of rotor blades, the spar air duct having at least one inlet disposed at a trailing edge of the one or more rotor blades and at least one outlet disposed at a leading edge of the one or more rotor blades, a blade tip outlet disposed at a blade tip of the one or more rotor blades, the blade tip outlet in fluid communication with the spar air duct such that an airflow through the spar air duct is selectably urged through the at least one outlet and/or the blade tip outlet to selectably increase blade lift and/or reduce noise; and, at least one flap disposed at the trailing edge of the one or more rotor blades of the plurality of rotor blades.

* * * * *